Feb. 7, 1956 S. C. TRENCHARD 2,733,684
URINE TEST SAMPLE COLLECTING MEANS
Filed Aug. 12, 1953
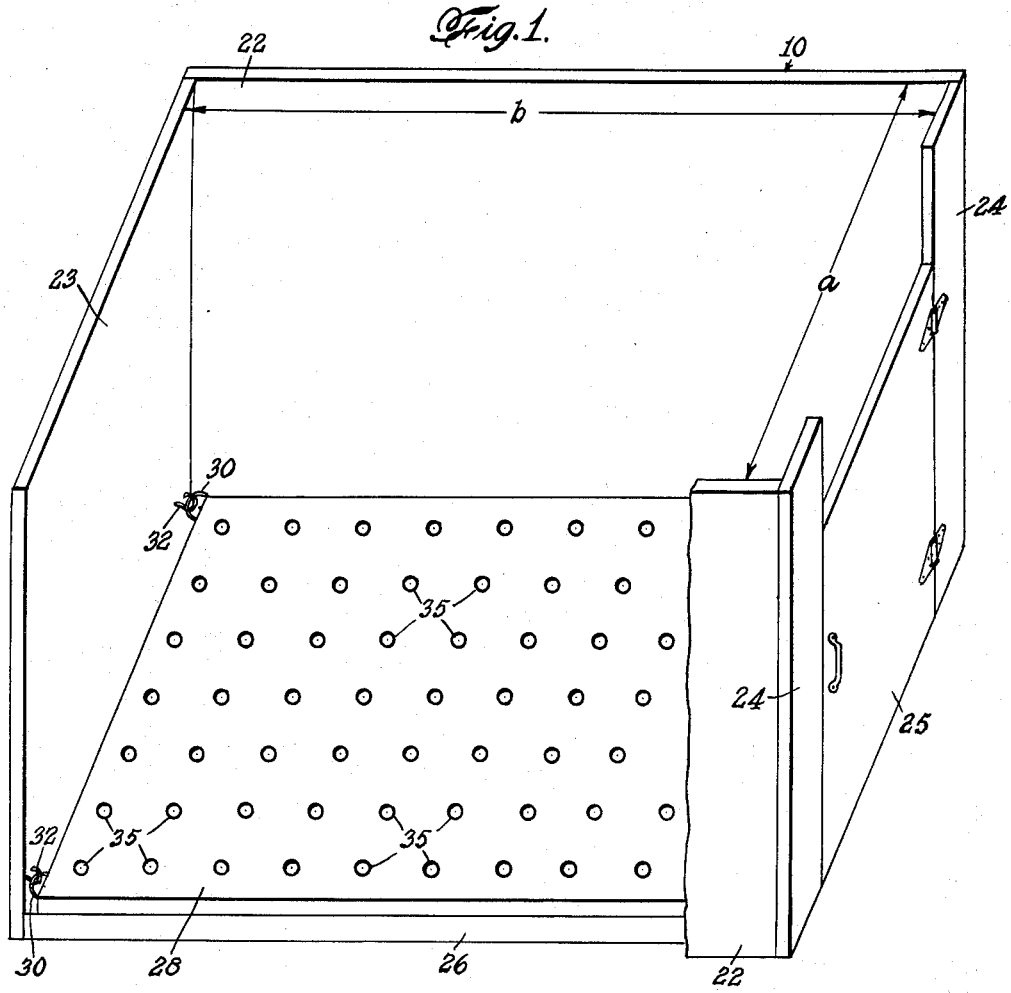
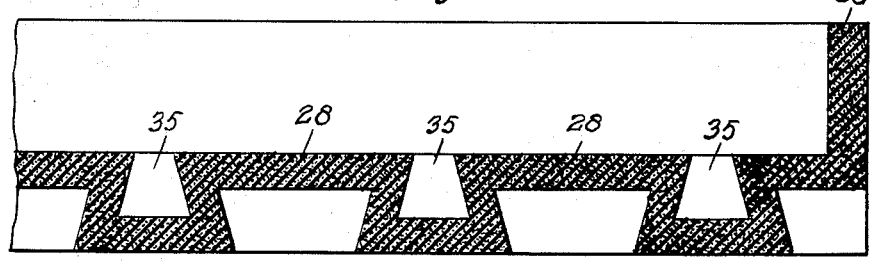

United States Patent Office 2,733,684
Patented Feb. 7, 1956

2,733,684

URINE TEST SAMPLE COLLECTING MEANS

Sidney C. Trenchard, Audubon, N. J.

Application August 12, 1953, Serial No. 373,842

5 Claims. (Cl. 119—28)

This invention relates to a test sample collecting means method and is more particularly concerned with an arrangement and method whereby urine samples may be collected from race horses and like animals preparatory to making the urinalyses required by the racing commissions of the several States.

Under the rules of the commissions in the several States who are charged with the supervision and control of racing within their respective jurisdictions, an analysis must be made of the urine of at least the winner of every race. This makes it possible for the commission to determine, inter alia, whether artificial stimulants were administered to the animal before or during the race. If the presence of such stimulants is detected, the animal is disqualified and severe penalties are imposed upon its owner. The urinalysis is, therefore, an important part of the proper administration and supervision of racing by the commission and the urine specimen is always taken and an analysis always made of the first urine passed by the animal after the race. The major difficulty, however, has been in collecting the necessary specimen. The analysis is made by standard testing procedures in a laboratory or other suitable location, but the specimen must be collected, in the stable, by representatives of the racing commission who are relative strangers to the animal. Moreover, racing animals, particularly thoroughbred horses, are extremely high strung and excitable, especially just after a race and the presence of strangers in or near the stall attempting to obtain a urine specimen only serves to excite the animal further. As a result, the animal thrashes in his stall and injury frequently results. Racing animals are extremely valuable and any injury which may disable them represents a serious loss to their owners. Moreover, the persons attempting to collect the specimen must frequently go in the stall with the animal and when the animal thrashes there is serious danger of injury to the human beings involved. In addition, because of the presence of strangers and the resultant excitement, the animal frequently does not pass his urine for long periods of time. It is not unusual for the process of collecting the necessary urine specimen to take several hours. The process is, therefore, annoying and disagreeable to the animals, to their owners and to the commission representatives who must collect the specimens. It has long been recognized that the customary procedures are entirely unsatisfactory.

It is an object of the present invention to provide a procedure for collecting urine specimens from racing animals, particularly race horses, which avoids the disadvantages and drawbacks of procedures heretofore employed.

It is a further object of the invention to provide in an animal stall a specimen collecting device which makes possible the collection of the urine specimen from the animal under normal conditions.

It is another object of the invention to provide a specimen-collecting sheet suitable for use in an animal stall.

In accordance with the invention, urine specimens are collected from racing animals, particularly race horses, by placing in their stalls a flexible, resilient, fluid-resistant sheet which overlies the floor of the stall and may be secured therein and which is provided with small fluid-retaining wells in which the urine will collect and from which it may be recovered for use in subsequent tests. The animal is placed in the stall provided with the mat as soon after the race as possible and the first urine passed by the animal is collected in the wells of the mat. The mat is then easily removed and the desired specimen taken.

It is a feature of the invention that the urine sample may be collected easily and rapidly, without danger to the animal or the persons involved.

It is a further feature of the invention that it is not necessary for the persons who are charged with the collection of the specimen to be in the animal's stall or even to be in the vicinity of the stall during the collection of the urine.

Other objects and features of the invention will be readily apparent from the following detailed description of an illustrative embodiment thereof and from the accompanying drawing, wherein, Fig. 1 is a perspective view of a stall provided with a specimen collecting device embodying features of the present invention;

Fig. 2 is an enlarged cross-sectional view of the sheet shown in Fig. 1 showing the wells formed therein; and Fig. 3 is a cross-sectional view of a modified form of specimen collecting sheet constructed in accordance with the invention.

Referring to the drawing and more particularly to Fig. 1, the reference numeral 10 designates generally a race horse stall having side walls 22, a back 23 and a front wall 24 provided with a door 25. The stall has a width $a$ and a depth $b$. Overlying the floor 26 of the stall, which may be constructed of concrete, wood, or other like material conventionally used for this purpose, and which may have hay or straw covering it, is a sheet 28 formed from a fluid-resistant, flexible, resilient material. Advantageously, the mat is formed from rubber, foam rubber, vinylite, polyethylene or other like elastomeric material having rubber-like properties. The sheet 28 is dimensioned to cover the stall floor 26 substantially completely, as shown in Fig. 1, i. e. it has dimensions substantially corresponding to $a$ and $b$. In order to insure against displacement of the sheet 28 by the animal in walking in the stall, the sheet is advantageously provided with anchor loops 30, which are conveniently placed at the corners of the sheet, and these loops may be engaged by hooks 32 of any suitable shape provided in the stall walls. Desirably, the hooks 32 are recessed in the body of the walls so that they do not protrude into the enclosure defined by the stall where the animal might come into contact with them. If space permits the loops 30 may be passed through apertures in the stall walls and the hooks 32 may be placed exteriorly of the stall for engagement with the loops. The loops 30 may be formed integrally with the sheet 28 or they may be separately formed and secured, as by stitching or heat welding, to the sheet.

In accordance with the invention, the sheet 28 is provided with a plurality of spaced wells 35 which extend inwardly from the upper surface of the sheet and project from its lower surface. The wells 35 are conveniently formed by means of conventional molding techniques when the rubber sheet is manufactured. The wells may be cylindrical, conical or of other like geometrical shape, but advantageously they are of frusto-conical shape as shown with the base extending upwardly, more clearly in Fig. 2, and particularly good results are obtainable when they are of frusto-conical shape with the base extending downwardly, as shown in Fig. 3. While the wells 35 are suitably circular in horizontal cross section they may be oval or oblong although preferably they are dimensioned to hold a relatively small pool of liquid, e. g. 5 cc. Preferably the distance between adjacent wells is substantially greater than the diameter of the wells, e. g. a distance 5 or 6 times the diameter, although this distance may vary. The wells are advantageously at least ½" deep and the sheet 28 is up to about ¼" thick, 1/16" being the minimum thickness for practical purposes. As a specific embodiment there may be mentioned, merely by way of example, a sheet 3/16" thick formed from vulcanized natural rubber ten feet wide and eleven feet long provided over its entire surface with frusto-conical wells one inch deep and of one-half inch average diameter, the wells being arranged in horizontal and vertical rows with the peripheries of the wells in each row being spaced by a distance of three inches from the wells of the next adjacent row.

Advantageously, the sheet may be formed with a border or rim in order to insure against any loss of liquid over the edge of the sheet. Thus, the sheet 28 in Fig. 3 is provided with an upwardly-extending rim 38 which completely surrounds the sheet at its marginal edges. The rim may, for example, be an inch high.

To use the sheet for collecting urine in accordance with the invention, the sheet is placed in the stall before the animal is led in after the race, the loops 30, if provided, being engaged with the hooks 32. The sheet 28 must be clean and free from contamination with urine from previous use. The animal, e. g. the winning race horse, is then led into the stall and left alone. Under normal circumstances, when there are no strangers visible in the vicinity, the horse will urinate within a few minutes. The horse is then led from his stall momentarily by his keeper and the sheet 28 is removed and the urine sample taken from it and placed in a suitable container for the urinalysis. The horse is then returned to his stall and the sheet washed so that it will be ready for repeated use.

By reason of the specified construction of the sheet, the urine remains in the wells even if the horse walks excessively or lies down and an adequate specimen for urinalysis is always obtained. Moreover, the specimen is obtained rapidly and easily without danger to animal or human being.

It will be apparent that various changes may be made in the embodiments described and illustrated without departing from the scope of the invention as defined in the appended claims. For example, the sheet 28 may be fabric reinforced if desired and attaching means in the form of eyelets or the like may be substituted for the loops 30. It will further be understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

What I claim and desire to secure by Letters Patent is:

1. In a stall having a floor and side walls, a relatively thin sheet formed from fluid-resistant, flexible resilient material having wells for accumulating liquid substantially completely overlying said floor, said sheet having approximately the dimensions of the area enclosed by the walls of the stall, and means for securing said sheet in said stall.

2. In a stall having a floor and side walls, a relatively thin sheet formed from fluid-resistant, flexible resilient material having uniformly spaced wells of circular cross-section for accumulating liquid substantially completely overlying said floor, said sheet having approximately the dimensions of the area enclosed by the walls of the stall.

3. A device for collecting urine from an animal to provide a specimen for urinalysis comprising a sheet formed from a fluid-resistant, flexible, resilient material, said sheet having a plurality of wells extending inwardly from the top face thereof, said wells being spaced apart a distance greater than their diameters, and said wells extending a substantial distance from the bottom face of said sheet.

4. A device for collecting urine from an animal to provide a specimen for urinalysis comprising a sheet formed from a fluid-resistant, flexible, resilient material, and means connected to said sheet for securing it to an adjacent surface, said sheet having a plurality of wells extending inwardly from the top face thereof, said wells being spaced apart a distance greater than their diameters, and said wells extending a substantial distance from the bottom face of said sheet.

5. A device for collecting urine from an animal to provide a specimen for urinalysis comprising a sheet formed from a fluid-resistant, flexible, resilient material, said sheet having a plurality of frusto-conical wells extending inwardly from the top face thereof, said frusto-conical wells being spaced apart a distance greater than their diameters, and said wells extending a substantial distance from the bottom face of said sheet.

References Cited in the file of this patent

UNITED STATES PATENTS

| Number | Name | Date |
|---|---|---|
| 204,655 | Clark | June 11, 1878 |
| 454,745 | Lee | June 23, 1891 |
| 658,789 | Legg | Oct. 2, 1900 |
| 1,377,683 | Henes | May 10, 1921 |
| 1,483,157 | Chabbert | Feb. 12, 1924 |
| 1,711,127 | Reinosky | Apr. 30, 1929 |
| 1,930,398 | Souchard | Oct. 10, 1933 |
| 1,970,754 | Jonasen | Aug. 21, 1934 |
| 2,165,385 | Kane | July 11, 1939 |
| 2,626,387 | Berry | Jan. 20, 1953 |

FOREIGN PATENTS

| Number | Country | Date |
|---|---|---|
| 796,824 | France | Feb. 3, 1936 |
| 54,382 | Netherlands | Mar. 17, 1943 |
| 586,252 | Great Britain | Mar. 12, 1947 |